Oct. 5, 1954    F. B. KIRKSEY    2,690,594
ACOUSTICAL TILE AND METHOD OF MANUFACTURE
Filed March 17, 1952

FORM AQUEOUS SLURRY OF GELLED AND UNGELLED STARCH
CONTAINING POLYVINYL ACETATE
↓
MIX SLURRY WITH EXPANDED PERLITE TO FORM FROTHY,
RELATIVELY STIFF MASS
↓
SPREAD MIX INTO THIN LAYER
↓
SCREED THE SURFACE OF LAYER
↓
HEAT LAYER TO START DRYING TO 170° F
↓
GRADUALLY INCREASE TEMPERATURE TO 280° F TO COMP-
-LETELY DRY PRODUCT

FIG. 1

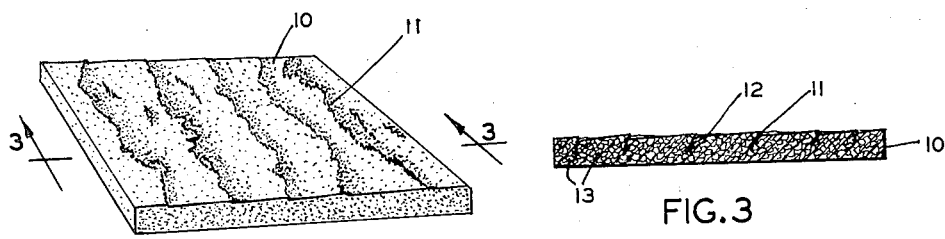

FIG.2    FIG.3

INVENTOR.
FRANK B. KIRKSEY
BY
*Buckhorn and Cheatham*
ATTORNEYS

Patented Oct. 5, 1954

2,690,594

UNITED STATES PATENT OFFICE 2,690,594

ACOUSTICAL TILE AND METHOD OF MANUFACTURE

Frank B. Kirksey, Dant, Oreg., assignor to Dant & Russell, Inc., Portland, Oreg., a corporation of Oregon Application March 17, 1952, Serial No. 277,091

10 Claims. (Cl. 18—55)

The present invention relates to acoustical tiles and to methods for manufacturing the same.

Many attempts have heretofore been made to produce a fireproof acoustical tile employing a mineral derivative as the principal component but the products in general have been unsatisfactory. In most instances, the tiles have been dense and heavy in weight, making it difficult to secure the tiles in place, especially upon ceilings, and the acoustical properties of many have been far from satisfactory. Other tiles of the class herein considered have been relatively low in mechanical strength or extremely fragile.

It is a principal object of the present invention to provide a new and improved fireproof mineral tile having high acoustical properties.

A still further object of the present invention is to provide a new and improved fireproof acoustical tile of light weight and having high mechanical strength.

Still another object of the invention is to provide a moldable composition from which may be formed acoustical tiles of low density and high mechanical strength.

A further object of the present invention is to provide a fireproof mineral tile which is relatively tough and which will resist breakage during ordinary handling.

Another object of the present invention is to provide a new and improved method for the manufacture of fireproof acoustical tile.

Other objects and advantages of the present invention will appear hereinafter.

The foregoing objects are accomplished by the present invention in the formation of an acoustical tile incorporating expanded perlite particles as the base material compounded with a mixture of pototato starch, corn starch and polyvinyl acetate as a binder.

In forming the tile of the present invention there is first prepared an aqueous slurry of corn starch and potato starch in such a manner that the starches are gelled. This slurry is combined with a second aqueous slurry comprising ungelled corn starch and an aqueous emulsion of polyvinyl acetate. The resulting slurry is mixed with a quantity of finely divided expanded perlite to form a thick, pasty mass which is poured into trays or pans preparatory to drying. To increase the effective surface area of the completed tile, the layers as formed on the drying trays are subjected to a screeding operation so as to rend or tear the upper surface thereof. The potato starch is of value in this connection inasmuch as the long, stringly tentacles formed upon gelling assist in tearing the surface of the wet perlite mix and retain the fissures through the drying operation to produce a product having deep crevices or fissures. After the screeding operation, the material is dried to form hard, strong slabs which may be cut to form individual tiles of desired shape or configuration.

In the drawings,

Fig. 1 is a flow sheet of the process of the invention;

Fig. 2 is a perspective view of a tile made in accordance with the invention; and Fig. 3 is a sectional view taken along line 3—3 of Fig. 2.

Referring to Figs. 2 and 3 of the drawing, the tile made in accordance with the invention is indicated generally at 10. The screeding operation performed on the tile forms fissures 11 in the tile and a travertine surface 12 which imparts an attractive appearance to the finished tile. The voids or pores formed by the foaming of the ungelled starch are indicated at 13.

While the particle size of the expanded perlite is not extremely critical, I have found it preferable to use a mixture of perlite ranging in particle size from about 8-mesh to 100-mesh with the particles evenly proportioned throughout the intermediate sizes within this range. Excessive portions of particles of either larger or smaller size than the preferred range result in tiles of lower mechanical strength.

As indicated above, the potato starch is used in the practice of the present invention because of its quality in aiding in the formation of a fissured product. However, potato starch is not a satisfactory binder by itself since it gives little strength to the finished product. Corn starch, on the other hand, is an excellent binder, imparting high strength to the finished tile. Thus I prefer to utilize both potato starch and corn starch in the formation of the tile of my invention because of the individual qualities imparted to the finished product by each.

Since starches vary considerably in quality and characteristics as obtained from individual sources of supply, I have found it desirable to arbitrarily establish a standard as to certain properties which may be determined by tests to which the starches should conform in the practice of the invention to insure a product of uniform quality. The proportions of ingredients are dependent in part upon the properties of the starches used and as set forth in this specification conform to the proportions I have found result in the best product with starches having the particular qualities set forth below. It should be understood, however, that certain variations in proportions of ingredients may be necessary if the starches used in the practice of the method herein taught do not conform to the standards set forth, but that the use of other starches is within the scope of the invention.

Considering first the potato starch, it is preferably a starch which will produce a very viscous, stringy slurry. To test the potato starch, 12 grams thereof having a water content not exceeding 17% are gelled with 300 cc. of water at 180° F. This mixture is poured into a Scott viscosity tester having an outlet orifice of 0.1065" diameter. The liquid level of a solution of a satisfactory starch will drop from the top to the bottom indicator of the tester in from 100 to 130 seconds.

The corn starch is tested in a similar manner. In this case, corn starch having a pH of from 7.5 to 8 is preferred, of which 18 grams having a water content not to exceed 12% are gelled with 300 cc. of water at 180° F. to prepare the test solution. When tested in a Scott tester having the same outlet orifice diameter as mentioned above, the liquid level of a solution of suitable corn starch should drop from the top to the bottom indicator in from 25 to 35 seconds.

The polyvinyl acetate is preferably incorporated as an aqueous emulsion with the slurry of ungelled corn starch. The emulsion I have found it convenient to employ is one having a pH between 4 and 4.5 and having a 55% solids content of a particle size of from 2 to 10 microns. I have found that the incorporation of polyvinyl acetate supplies strength and flexibility to the finished tile, enabling it to be handled with much less breakage. Attempts to make a tile in which the polyvinyl acetate was not present resulted in products which were extremely brittle and fragile.

I wish to emphasize the fact that a portion of the corn starch remains ungelled prior to the mixing of the starch slurry with the perlite. This is to assist in the production of a product of lower density than would be the case if all the starch were gelled, since the ungelled starch causes a foaming action during the mixing to impart voids or pores to the wet perlite mix. These voids will persist through the drying operation to form a porous product which, of course, will decrease the density thereof. The polyvinyl acetate emulsion is also of value in this regard inasmuch as it enhances the foaming action. If desired, other foaming agents could be added to the starch slurries before they are mixed with the perlite.

It should also be noted that a portion of the corn starch is gelled prior to incorporating the expanded perlite. The gelled corn starch imparts a degree of stiffness to the mix which facilitates the formation and retention of the fissures formed in the screeding operation. In the absence of gelled corn starch, the amount of potato starch would have to be increased to obtain the desired fissured contour of the mix. Since the potato starch imparts no strength to the finished tile, its presence in large amounts would result in a product of lesser strength and should, therefore, be held to a minimum.

In drying the perlite mix, it is important that the operation be performed so that the starch is completely gelled and the water is substantially completely removed throughout the tiles. I have found that the drying should be commenced at a temperature slightly above the gelling temperature of the starch and gradually increased so as to first cause the starch to gel completely and then to cause the moisture to be driven from the tile but so slowly as to permit the moisture from the interior to migrate to the surface. To prevent the surface layers from drying too rapidly and forming a hard case which would prevent or retard the removal of the water from the interior of the slab, it is advisable that the drying be carried out in an atmosphere of relatively high humidity. The preferred drying procedure also inhibits any migration of the gels during the drying and produces a product of uniform texture.

The practice of the invention is further illustrated by the following example:

65 lbs. of potato starch and 135 lbs. of corn starch were mixed with 25 gals. of cold water. This was added to 235 gals. of water at 200° F. and the mixture agitated for 15 minutes to form a gel. 155 gals. of cold water were then added to reduce the temperature of the slurry below 150° F., that is, below the gelling temperature of the starch. The slurry thus prepared will be referred to hereinafter as starch batch A.

A slurry of corn starch was then prepared by mixing 100 lbs. of corn starch with 25 gals. of cold water to which was added 15 gals. of an aqueous emulsion of polyvinyl acetate having a pH between 4 and 4.5 and a 55% solids content of a particle size of from 2 to 10 microns. It should be noted that in this slurry, which will hereinafter be referred to as starch batch B, the starch remains in its ungelled state.

Starch batches A and B were then combined and 55 gals. of the resulting slurry added to 28 cu. ft. of expanded perlite and thoroughly mixed therewith. The starch and aggregate mixture was then poured out on aluminum trays coated with a silicon resinous composition of a type ordinarily used in bakeries for coating baking pans upon which was spread a thin layer of a high temperature mineral oil, after which the trays were passed through a screeding machine for the purpose of producing a travertine surface in the starch and aggregate layer.

The trays were then placed in an oven in which a high humidity was maintained and dried through the following drying schedule:

2 hours at 170° F.
2 hours at 180° F.
2 hours at 190° F.
2 hours at 200° F.
2 hours at 210° F.
2 hours at 220° F.
2 hours at 240° F.
2 hours at 280° F.

This drying cycle resulted in the formation of hard, strong slabs having a moisture content of from only 1% to 2%, and in a condition to be finished to the desired shape and configuration which might be desired for the tile.

The particle size of the expanded perlite used above was rather evenly distributed between particles of 8-mesh and 100-mesh sizes indicated by the following specification:

All particles smaller than 8-mesh
Maximum 10% greater than 14-mesh
Maximum 30% between 14- and 28-mesh
Maximum 30% between 28- and 48-mesh
Maximum 30% between 48- and 100-mesh
Maximum 10% less than 100-mesh The starches used in the preparation of the tile of the example conform to the specifications set forth above. As indicated, the proportions of the example are the preferred proportions in the manufacture of the tile of the invention. However, certain variations in proportion may be made. For example, if a fissured product is not desired, the potato starch may be eliminated. On the other hand, since the potato starch does not impart strength to the finished product, the proportion thereof should not be increased greatly beyond that given in the example which is the favored proportion necessary to accomplish the desired tearing action of the wet perlite mix during screeding. The amount of corn starch employed may be reduced but with a sacrifice in the mechanical strength, that is, rigidity of the end product. The proportion of the corn starch may, on the other hand, be increased beyond the preferred proportion given above but with a corresponding increase in density of the product. Also, a greater proportion of the pores would be sealed with the use of more corn starch which would, in turn, reduce the acoustical properties of the tile. It should be pointed out that the aqueous starch slurries are perishable and should be used within a few hours of their preparation.

It has also been found that the proportion of polyvinyl acetate given in the above example is the preferred amount, imparting the desired degree of toughness to the finished tile. An increase in the amount of polyvinyl acetate above the preferred proportion does not seem to result in any substantial improvement in the final product.

The water resistance of the finished tile may be enhanced if a small quantity of a natural resin is added to the mix during the preparation of the tile. For example, I have found it satisfactory to add to the corn starch slurry, or B batch, of the example above about ¾ gal. of an aqueous emulsion of a high boiling, gasoline soluble, toluene insoluble, wood resin obtained from Southern pine trees and having a melting point of about 114° C. and a flash point of about 235° C. This resin is commercially obtainable under the trade-name "Vinsol" from the Hercules Powder Company. In addition to enhancing the water resistant properties of the tile, this resin emulsion also serves somewhat as a foaming agent during the formation of the tile which, of course, aids in decreasing the density thereof.

Acoustical tile prepared in accordance with the foregoing specification was tested in the acoustical laboratories of the Acoustical Materials Association and was reported to possess a noise-reduction coefficient of 0.70. This is a high noise-reduction coefficient for an all-mineral, nonfibrous, fireproof, acoustical tile. Moreover, tile units 12" square and 13/16" thick have a weight of 0.88 lbs. and tile units 12" square with a thickness of 13/16" possess a weight of only 0.91 lb. which is substantially less than the weight of any comparable all-mineral, nonfibrous, acoustical tiles heretofore produced.

Having illustrated and described the invention in what is considered to be a preferred embodiment thereof, it is desired that it be understood that the specific details given are merely illustrative and that the invention may be carried out in other ways. I claim as my invention all such modifications as come within the true spirit and scope of the appended claims.

I claim:

1. The method of manufacturing an acoustical tile which comprises forming an aqueous starch slurry containing polyvinyl acetate wherein the ingredients are in the approximate proportion of 300 lbs. of starch, 440 gals. of water and 15 gals. of an aqueous polyvinyl acetate emulsion having a 55% solids content, a substantial proportion of said starch being in a gelled state and the remainder in an ungelled state, mixing said slurry with expanded perlite in the ratio of 55 gals. of slurry to 28 cu. ft. of expanded perlite having a particle size substantially between 8 and 100 mesh and a weight of from 6 to 9 lbs. per cu. ft. to form a frothy, relatively stiff, plastic mass, spreading said mass into a relatively thin layer, and drying said layer in a humid atmosphere by initially raising it to about 170° F. and gradually increasing the temperature thereof to about 280° F.

2. The process of making acoustical tile comprising the steps of forming a first aqueous slurry of gelled corn starch and gelled potato starch wherein the ingredients are in the approximate proportion of 65 lbs. of potato starch, 135 lbs. of corn starch and 415 gals. of water, forming a second aqueous slurry of ungelled corn starch having in approximate proportion to said first slurry ingredients in the ratio of 100 lbs. of corn starch, 25 gals. of water and 15 gals. of an aqueous polyvinyl acetate emulsion having a 55% solids content, mixing said first and second slurries, adding the mixed slurries to expanded perlite in the ratio of 55 gals. of said mixed slurries to 28 cu. ft. of expanded perlite having a particle size between about 8 and 100 mesh, spreading the wet perlite mix into layers, and drying the same at a temperature above the gelling point of the corn starch.

3. The process of making acoustical tile comprising the steps of forming a first aqueous slurry of gelled corn starch and gelled potato starch wherein the ingredients are in the approximate proportion of 65 lbs. of potato starch, 135 lbs. of corn starch and 415 gals. of water, forming a second aqueous slurry of ungelled corn starch having in approximate proportion to said first slurry ingredients in the ratio of 100 lbs. of corn starch, 25 gals. of water and 15 gals. of an aqueous polyvinyl acetate emulsion having a 55% solids content, mixing said first and second slurries, adding the mixed slurries to expanded perlite in the ratio of 55 gals. of said mixed slurries to 28 cu. ft. of expanded perlite having a particle size between about 8 and 100 mesh, spreading the wet perlite mix into layers, screeding the upper surface of said layers, and drying said layers by raising their temperature initially to 170° F. and gradually increasing their temperature to about 280° F. to substantially remove the water from throughout said layers.

4. The process of manufacturing acoustical tile which comprises forming an aqueous slurry including a portion of gelled potato starch and a portion of gelled corn starch and a third portion of ungelled corn starch, adding said slurry to a quantity of expanded perlite to form a relatively stiff, foamy plastic mass, spreading said plastic mass into a relatively thin layer, screeding the upper surface of said layer, and drying said layer by initially raising it to a temperature between the gelling point of said corn starch and the boiling point of water and gradually increasing its temperature to a point substantially above the boiling temperature of water until the moisture content of said layer is reduced substantially to zero.

5. The process of manufacturing acoustical tile which comprises forming an aqueous mixture containing a portion of starch in the gelled condition and a second portion of starch in the ungelled condition, adding said aqueous mixture to a quantity of expanded perlite particles, spreading the wet perlite mixture into a relatively thin layer, screeding the upper surface of said layer, and drying said layer at a temperature above the gelling temperature of the starch.

6. A thick, foamy, plastic mass comprising a mixture of water, gelled potato starch, gelled corn starch, ungelled corn starch, polyvinyl acetate and finely divided expanded perlite, said mixture characterized by its ability to retain fissures formed by screeding the surface of a layer thereof, which layer, when dried, will be converted to a porous, fissured tile having excellent acoustical properties.

7. The method of manufacturing an acoustical tile which comprises forming a slurry of water, corn starch, potato starch and polyvinyl acetate wherein the potato starch and a portion of the corn starch is in a gelled state and the remainder of the corn starch is in an ungelled state, mixing said slurry with a sufficient quantity of finely divided expanded perlite to form a thick, foamy, plastic mixture, spreading said mixture in a layer of desired shape, screeding the upper surface of said layer, and drying said layer.

8. The method of manufacturing an acoustical tile which comprises forming a slurry of water, corn starch, potato starch and polyvinyl acetate wherein the potato starch and a portion of the corn starch is in a gelled state and the remainder of the corn starch is in an ungelled state, mixing said slurry with a sufficient quantity of finely divided expanded perlite to form a thick, foamy, plastic mixture, spreading said mixture in a layer of desired shape, screeding the upper surface of said layer, and drying said layer at a temperature above the gelling temperature of the ungelled corn starch.

9. The process of making acoustical tile which comprises mixing a quantity of finely divided expanded perlite with a slurry of water, starch and polyvinyl acetate wherein a portion of the starch is in a gelled state and a further portion of the starch is in an ungelled state, spreading the mixture in the desired shape, and drying the mixture at a temperature above the gelling temperature of the starch to remove the water therefrom.

10. The process of claim 9 wherein said starch is corn starch.

References Cited in the file of this patent

UNITED STATES PATENTS

| Number | Name | Date |
| --- | --- | --- |
| 1,945,003 | Smolak | Jan. 30, 1934 |
| 2,102,937 | Bauer | Dec. 21, 1937 |
| 2,388,880 | Stitt | Nov. 13, 1945 |
| 2,401,445 | White | June 4, 1946 |
| 2,411,470 | Shaw | Nov. 19, 1946 |
| 2,413,885 | Pierson | Jan. 7, 1947 |
| 2,444,396 | Collins | June 29, 1948 |
| 2,487,207 | Adams | Nov. 8, 1949 |
| 2,563,661 | Rood | Aug. 7, 1951 |
| 2,565,107 | Watts | Aug. 21, 1951 |
| 2,565,686 | Hill | Aug. 28, 1951 |
| 2,580,076 | Deane | Dec. 25, 1951 |
| 2,583,292 | Bowen | Jan. 22, 1952 |

FOREIGN PATENTS

| Number | Country | Date |
| --- | --- | --- |
| 569,591 | Great Britain | May 31, 1945 |